United States Patent
Sano et al.

(10) Patent No.: US 10,678,392 B2
(45) Date of Patent: Jun. 9, 2020

(54) PSEUDO PUSH DETERMINATION METHOD IN TOUCH SENSOR WITHOUT FORCE SENSOR

(71) Applicant: Wacom Co., Ltd., Saitama (JP)

(72) Inventors: Shigeyuki Sano, Kanagawa (JP); Igor Karsuntsev, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/292,017

(22) Filed: Mar. 4, 2019

(65) Prior Publication Data

US 2019/0278418 A1 Sep. 12, 2019

(30) Foreign Application Priority Data

Mar. 8, 2018 (JP) ................................. 2018-041451

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ...... G06F 3/0416; G06F 3/044; G06F 3/0446; G06F 3/0414
See application file for complete search history.

(56) References Cited

U.S. PATENT DOCUMENTS

| | | | |
|---|---|---|---|
| 9,798,409 B1 | 10/2017 | Wells et al. | |
| 2013/0093692 A1* | 4/2013 | Wang | G06F 3/0416 345/173 |
| 2016/0253041 A1* | 9/2016 | Park | G06F 3/0418 345/174 |
| 2016/0282980 A1* | 9/2016 | Chintalapoodi | G06F 3/0416 |
| 2017/0177141 A1* | 6/2017 | Shih | G06F 3/0412 |
| 2017/0322661 A1* | 11/2017 | Varje | G06F 3/0416 |
| 2019/0114004 A1* | 4/2019 | Lee | G06F 3/0418 |

* cited by examiner

*Primary Examiner* — Premal R Patel
(74) *Attorney, Agent, or Firm* — Seed IP Law Group LLP

(57) ABSTRACT

A push determination determines whether an indicator has pushed or touched a local region of an interface in a touch sensor used with a display panel that displays a graphical user interface. A method according to the present disclosure includes: outputting area data corresponding to a size of a tracking region and sum total data corresponding to a sum total value of level values at positions included in the tracking region; and, in a case where the sum total data indicates the sum total value is greater than a predetermined sum total value, determining an event corresponding to a push operation is to be output when the area data indicates a second area value smaller than a first area value and determining an event corresponding to a touch operation is to be output when the area data indicates the first area value.

8 Claims, 9 Drawing Sheets

FIG.4B

|     | X0 | X1 | X2 | X3 | X4 | X5 | X6 | X7 | X8 | X9 | X10 | X11 | X12 | X13 | X14 | X15 |
|-----|----|----|----|----|----|----|----|----|----|----|-----|-----|-----|-----|-----|-----|
| Y0  |    |    |    |    |    |    |    |    |    |    |     |     |     |     |     |     |
| Y1  |    |    |    |    |    |    |    |    |    |    |     |     |     |     |     |     |
| Y2  |    |    |    |    |    |    |    |    |    |    |     |     |     |     |     |     |
| Y3  |    |    |    |    |    |    |    |    |    |    |     |     |     |     |     |     |
| Y4  |    |    |    |    |    |    | 11 | 10 |    |    |     |     |     |     |     |     |
| Y5  |    |    |    |    |    |    |    |    |    |    |     |     |     |     |     |     |
| Y6  |    |    |    |    |    |    |    |    |    |    |     |     |     |     |     |     |
| Y7  |    |    |    |    |    |    |    |    |    |    |     |     |     |     |     |     |
| Y8  |    |    |    |    |    |    |    |    |    |    |     |     |     |     |     |     |
| Y9  |    |    |    |    |    |    |    |    |    |    |     |     |     |     |     |     |

R at X6–X7, Y0: SW(1), SL(2)

Σ   21
S    2
Σ/S  11

|  | X0 | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|---|
| Y0 |  |  |  |  |  |  |  |  |  |  |  |  |  |  |  |  |
| Y1 |  |  |  |  |  |  |  |  |  |  |  |  |  |  |  |  |
| Y2 |  |  |  |  |  |  |  |  |  |  |  |  |  |  |  |  |
| Y3 |  |  |  |  |  |  | 10 | 10 | 10 | 10 |  |  |  |  |  |  |
| Y4 |  |  |  |  |  |  | 11 | 10 | 10 | 10 |  |  |  |  |  |  |
| Y5 |  |  |  |  |  |  |  |  |  |  |  |  |  |  |  |  |
| Y6 |  |  |  |  |  |  |  |  |  |  |  |  |  |  |  |  |
| Y7 |  |  |  |  |  |  |  |  |  |  |  |  |  |  |  |  |
| Y8 |  |  |  |  |  |  |  |  |  |  |  |  |  |  |  |  |
| Y9 |  |  |  |  |  |  |  |  |  |  |  |  |  |  |  |  |

S 8
Σ 81
Σ/S 10

PSEUDO PUSH DETERMINATION METHOD IN TOUCH SENSOR WITHOUT FORCE SENSOR

BACKGROUND

Technical Field

The present disclosure relates to a touch detection method in a touch sensor.

Background Art

A force-sensing touch sensor including a force sensor and configured to detect an operation (hereinafter, push operation) of applying predetermined force to an indication position is known (U.S. Pat. No. 9,798,409).

In a touch sensor without a force sensor, a push determination function for pseudo determination of a push operation is realized. Particularly, a push determination function is realized, in which data corresponding to the push operation is output when force is locally applied, such as in a case of a strong push with a fingertip, and false detection of an operation as the push operation is prevented when capacitance is changed in a wide range, such as when a finger is attached to the touch sensor.

BRIEF SUMMARY

A first aspect of the present disclosure provides a method performed by an integrated circuit connected to a touch panel used with a display apparatus that displays a graphical user interface, the method including: acquiring level values indicating changes in capacitance at positions in a two-dimensional region of the touch panel; detecting a touch to the touch panel by an indicator based on a maximum value of the level values at the positions in the two-dimensional region; specifying a tracking region of a position where the maximum value is output; outputting area data corresponding to a size of the tracking region and sum total data corresponding to a sum total value of the level values at the positions included in the tracking region; and, in a case where the sum total data indicates the sum total value is greater than a predetermined sum total value, (a) determining an event corresponding to a push operation is to be output when the area data indicates a second area value smaller than a first area value, or (b) determining an event corresponding to a touch operation is to be output when the area data indicates the first area value.

A second aspect of the present disclosure provides a method performed by an integrated circuit connected to a touch panel, the method including: acquiring level values indicating changes in capacitance at positions in a two-dimensional region of the touch panel; detecting a touch to the touch panel by an indicator based on a maximum value of the level values at the positions; outputting sum total data of the level values of a tracking region that is positioned around a position where the maximum value is output; acquiring an amount of time change of the sum total data; and determining whether an event corresponding to a touch operation is to be output or an event corresponding to a push operation is to be output based on the amount of time change of the sum total data.

According to the first aspect of the present disclosure, the push operation is extracted based on the sum total data of the signal levels, and whether the value of the sum total data is in a local range or in a wide range is determined based on area data S. This enables distinction according to a signal level value per unit area. This can realize a push determination function, in which data corresponding to the push operation is output when the change level of the capacitance is locally increased by a strong push with a fingertip, and false recognition of an operation as the push operation is prevented when the change in capacitance is in a wide range such as when a finger is attached to the touchpad.

According to the second aspect of the present disclosure, the position of the tracking region R and the amount of time change $d\Sigma$ of the level values C of the sum total data $\Sigma$ are used to determine whether the amount of time change $d\Sigma$ at a predetermined position is increased. This can improve the determination accuracy of the push determination for determining whether the push operation is performed or the touch operation is performed.

BRIEF DESCRIPTION OF THE DRAWINGS

FIG. 4B depicts an example of a two-dimensional distribution of level values C in a weak touch operation state;

DETAILED DESCRIPTION OF THE PREFERRED EMBODIMENTS

Preferred embodiments of the present disclosure will now be described in detail with reference to the attached drawings.

First Embodiment

Figure 1A:
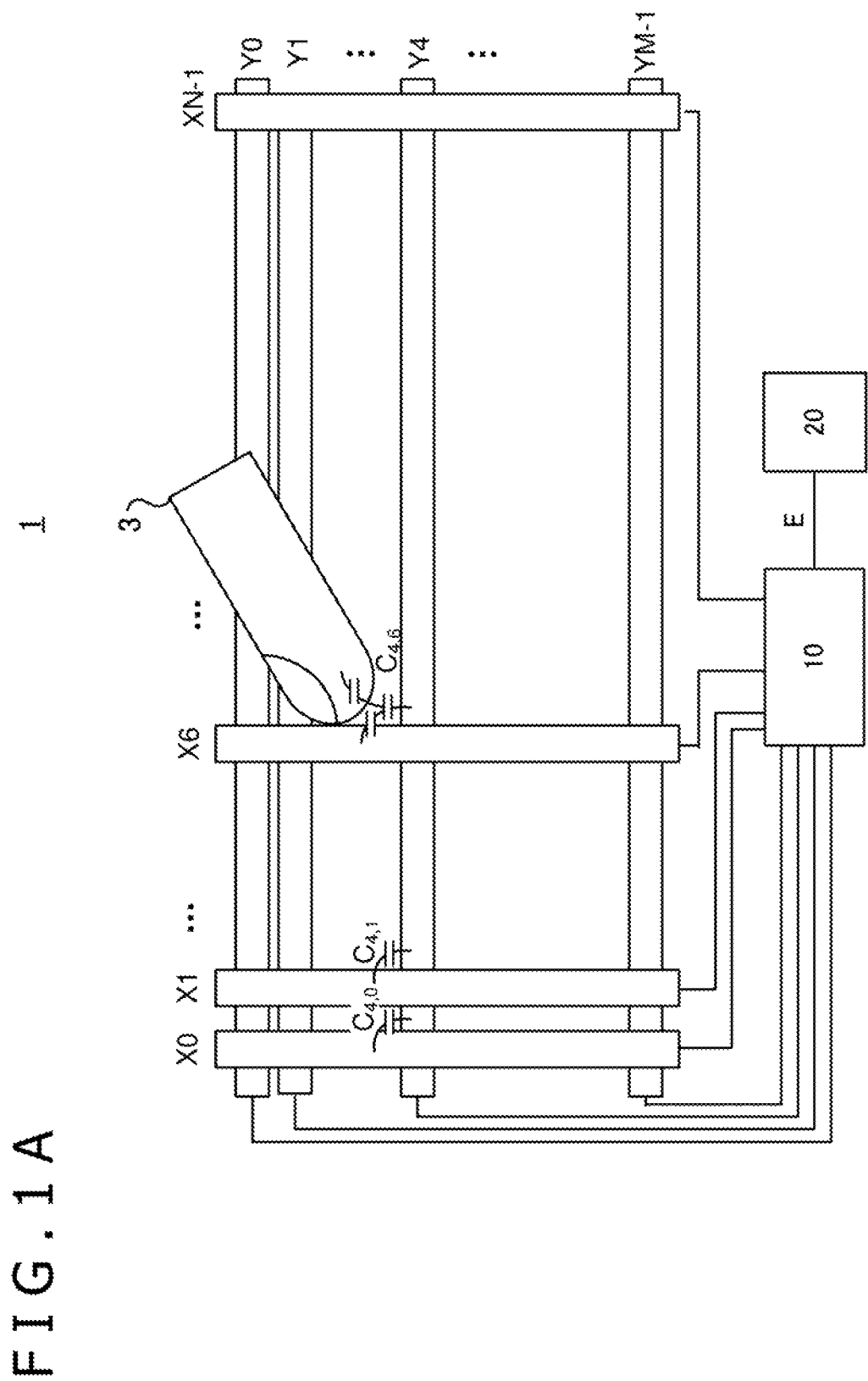
FIG. 1A is a schematic diagram of a touch sensor that performs a method according to one or more embodiments of the present disclosure.

FIG. 1A is a schematic diagram of a touch sensor 1 common to the embodiments of the present disclosure.

The touch sensor 1 is a touch sensor without a pressure sensor, and more preferably, the touch sensor 1 is a capacitive touch sensor. Specifically, the touch sensor 1 includes M row electrodes Y0 to YM-1 (hereinafter, referred to as row electrode group Y), N column electrodes X0 to XN-1 (hereinafter, referred to as column electrode group X), and an integrated circuit 10 connected to the row electrode group Y and the column electrode group X. For example, the integrated circuit 10 includes a processor and a memory storing instructions that, when executed by the processor, cause the touch sensor 1 to perform parts of the processes described herein.

The integrated circuit 10 performs mutual-capacitance touch detection by supplying signals to the row electrodes Y and detecting the signals through the column electrodes X to detect an amount of change in capacitance (hereinafter, level value C) at each of M×N intersection points formed by the row electrodes Y and the column electrodes X.

The touch sensor 1 is used as an input interface of an electronic device not illustrated. The row electrodes Y and the column electrodes X of the touch sensor 1 are provided to overlap with a display panel 2 (hereinafter, panel 2) of the electronic device. The integrated circuit 10 detects an approach of an indicator 3 to the panel 2 to detect a change in the level value C. The integrated circuit 10 performs touch detection involving push determination described later and outputs an event Σ (none N, touch event Etd, or push event Epd) according to a determination result of the push determination to a host controller 20 of the electronic device.

Figure 1B:
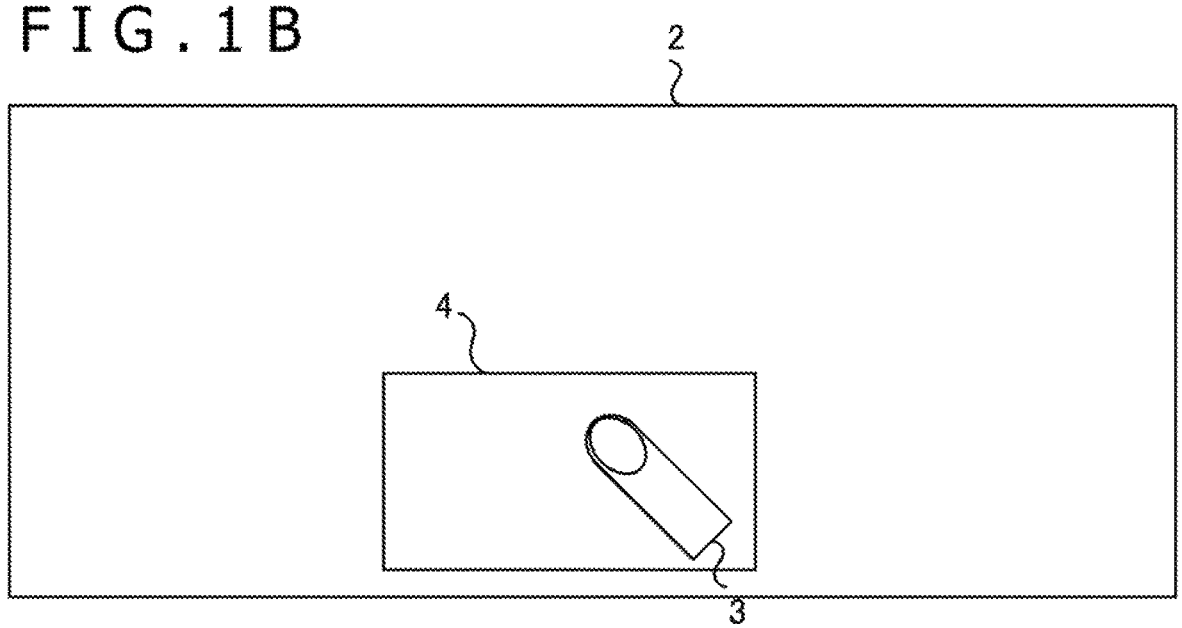
FIG. 1B is a schematic diagram describing a push determination function of the touch sensor.

FIG. 1B is a schematic diagram describing a first state determined in the push determination of the touch sensor 1. The host controller 20 of the electronic device displays various graphical user interfaces on the panel 2. In the example of FIG. 1B, the host controller 20 displays a rectangular region 4 and regards the rectangular region 4 as a touch panel with force sensing function of a laptop computer to perform a pseudo process. FIG. 1B illustrates a state in which a finger is attached and placed on a wide range on the panel.

Figure 1C:
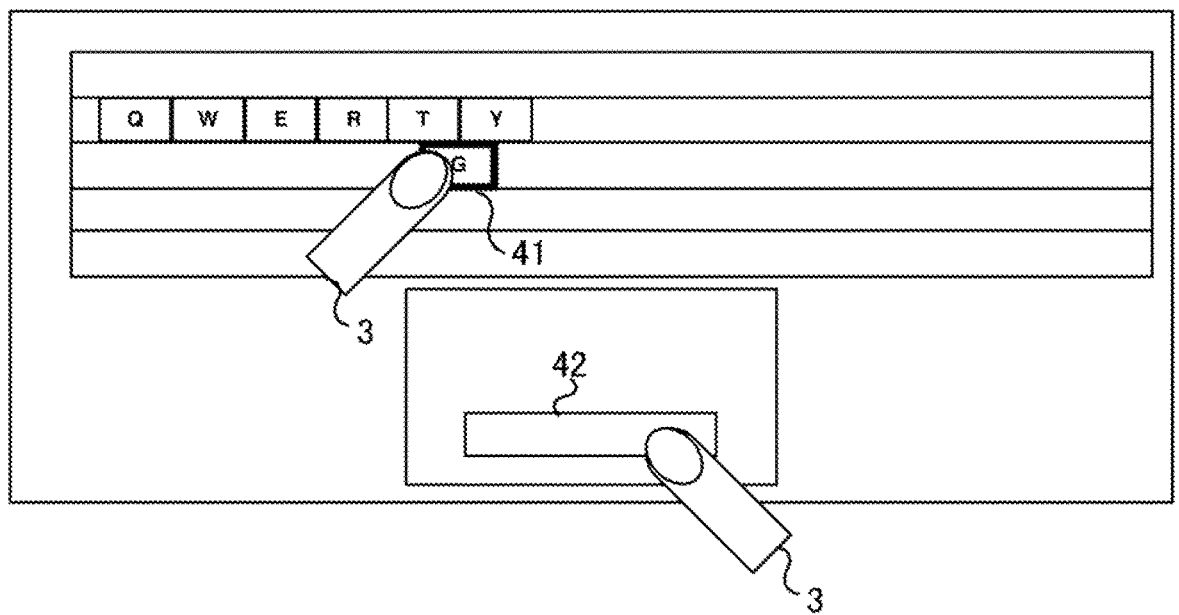
FIG. 1C is a schematic diagram describing the push determination function of the touch sensor.

FIG. 1C is a schematic diagram describing a second state (state with push operation) of two states to be distinguished by the push determination function of the touch sensor 1. A keyboard 41 and a touch push button 42 are displayed as graphical user interfaces on the panel 2. In such a case, although the graphical user interfaces are displayed, the user may use the interfaces as user interfaces with actual mechanical push switches, and the user may strongly press the indicator 3 against the panel 2. The push determination function of the present disclosure determines that the state with a strong push on the graphical user interface is the second state with push operation and distinguishes the second state from the first state.

Figure 2:
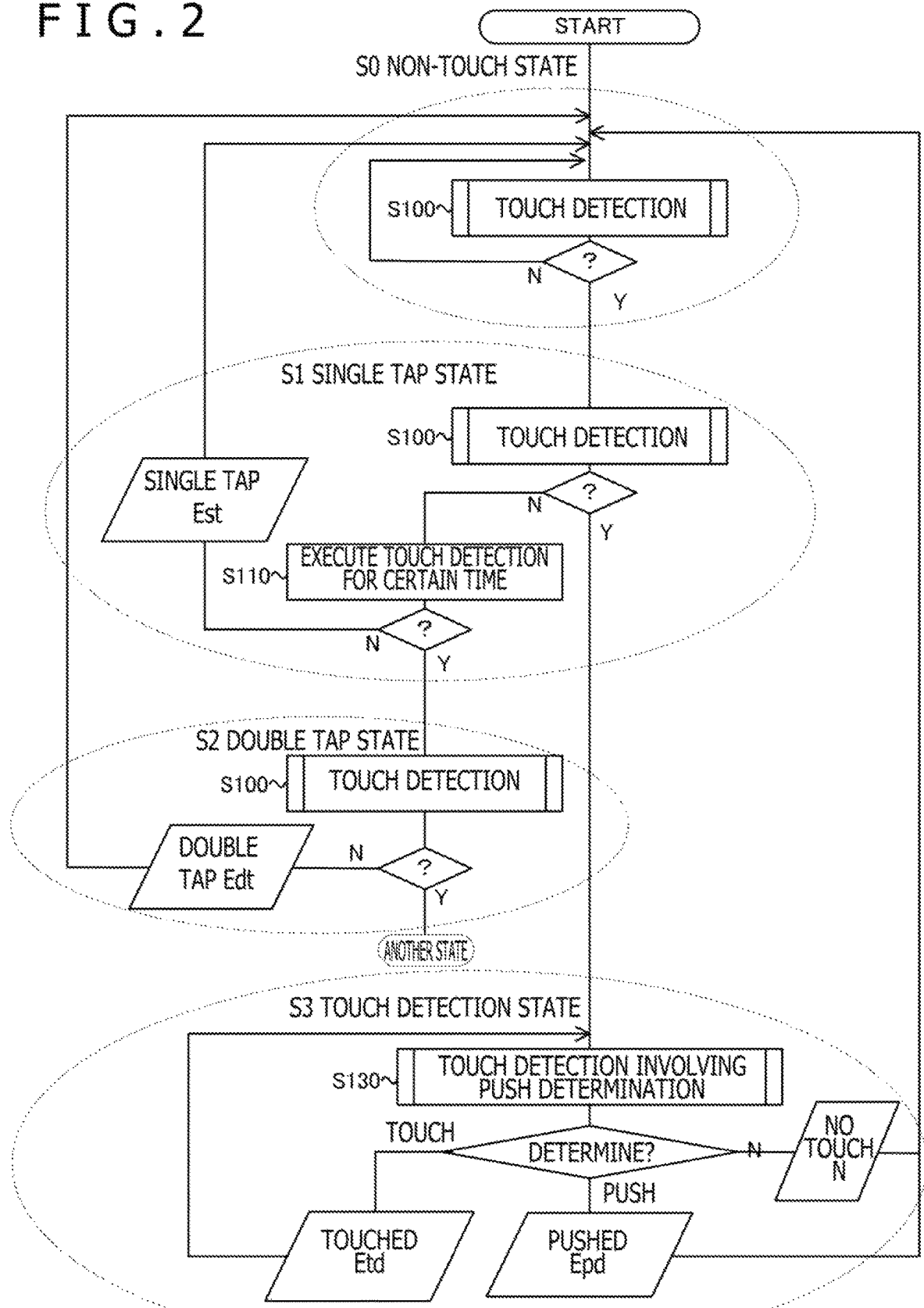
FIG. 2 is an overall flowchart of a push determination method according to one or more embodiments of the present disclosure.

FIG. 2 is an overall flowchart of a push determination method common to the embodiments. The flow will be described, and state transition will be described.

First, the initial state is set to a state S0 that is a non-touch state. Dashed ellipses in FIG. 2 indicate states. In the state S0, touch detection for detecting whether the indicator 3 is approaching is performed (S100).

Figure 3:
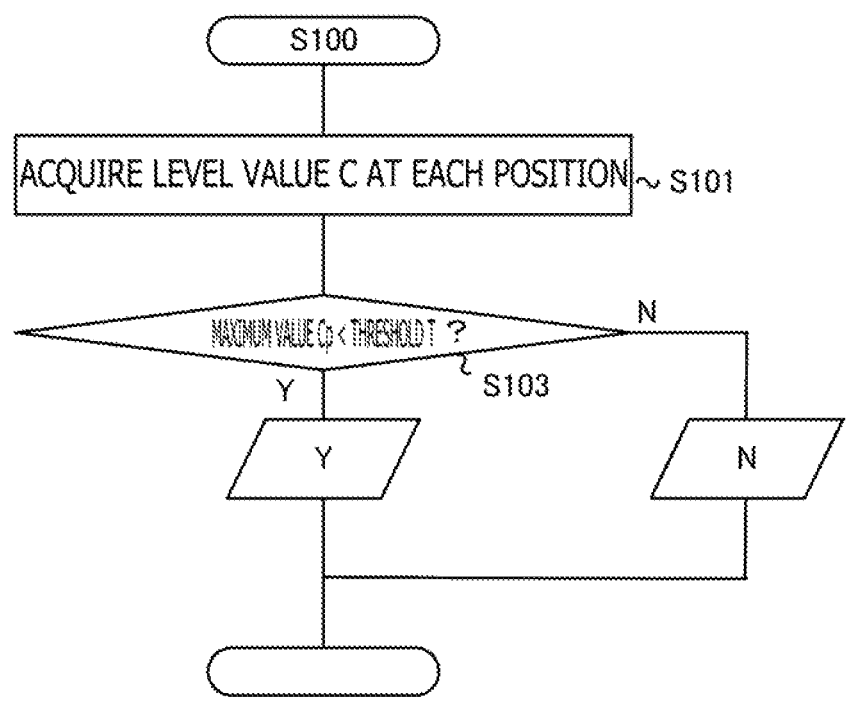
FIG. 3 is a flowchart of a touch detection at S100.

FIG. 3 is a flowchart of the touch detection at S100.

First, the level value C at each position of M×N cross points is acquired (S101). Whether a maximum value Cp of the M×N level values C is smaller than a predetermined detection threshold T is determined (S103). If the maximum value Cp is smaller than the detection threshold T (S103Y), data N indicating that there is no touch is internally output. If the maximum value Cp is equal to or greater than the detection threshold T (S103N), data Y indicating that there is a touch is output.

Figure 4A:
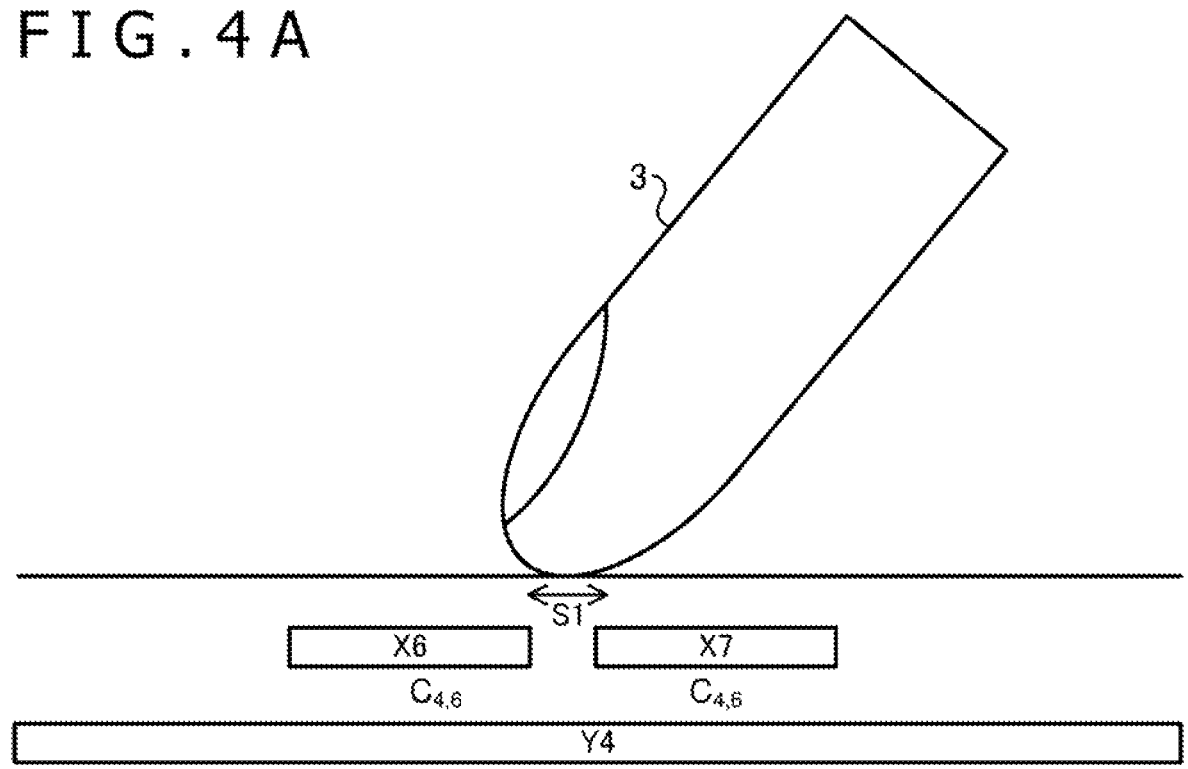
FIG. 4A depicts a state (touch operation state) in which an indicator weakly touches a panel.

FIG. 4A depicts a state in which the indicator 3 weakly touches the panel 2 (normal touch operation). FIG. 4B depicts an example of a two-dimensional distribution of the level values C in the weak touch operation state. Assuming that the value of the detection threshold T is 10 in the operation flow of FIG. 3, the level values C greater than the detection threshold T are detected at two intersection points in the example of FIG. 4B, including an intersection point of the row electrode Y4 and the column electrode X6 and an intersection point of the row electrode Y4 and the column electrode X7. Therefore, the data Y is output. Note that in the following description, a large level value corresponds to a large amount of change in the capacitance due to the approach of the indicator 3. The level value may be indicated by either a plus sign or a minus sign, and in the description here, the level value indicates a positive value when the indicator 3 approaches.

FIG. 2 will be further described. If a touch is not detected in the state S0 (S100N), the state S0 is repeated. If a touch is detected in the state S0 (S100Y), the state S0 shifts to a state S1 that is a single tap state.

The state S1 is a state in which a touch is already detected once and is a state for determining whether the touch is a single tap or a double tap. Therefore, the touch detection is performed again (S100), and if there is no touch (S100N), the touch detection is further performed for a certain time (S110). If a touch is still not detected, a single tap event Est is output as the event E. On the other hand, if a touch is detected during the performance of the touch detection for a certain time, the state S1 shifts to a state S2 that is a double tap state. An operation equivalent to the operation in the state S1 is performed in the state S2, and a double tap event Edt is output.

In the state S1, if a touch is detected at S100 (S100Y), the state S1 shifts to a state S3 that is a touch detection state. In the state S3, touch detection involving push determination is performed (S130).

Figure 5:
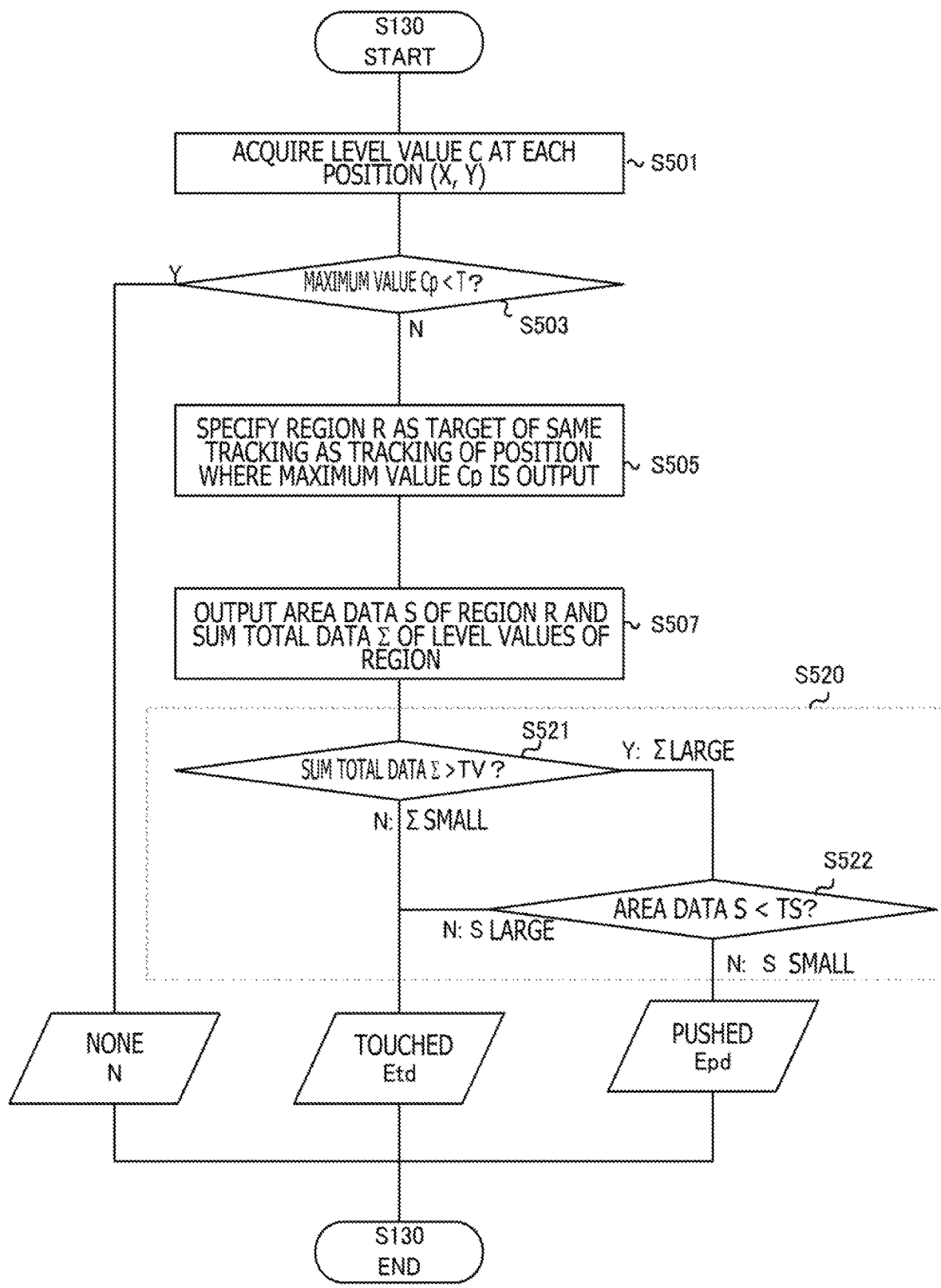
FIG. 5 is a flowchart of touch detection involving push determination according to a first embodiment of the present disclosure.

FIG. 5 is a flowchart of the touch detection involving the push determination according to the present embodiment.

First, the level value C at each position is acquired (S501).

Next, whether the maximum value Cp of the level values C is smaller than the detection threshold T (for example, value 10) is determined (S503).

On the other hand, if the maximum value Cp is smaller than the detection threshold T (case of S503Y), the data N indicating that there is no touch is internally output as an event, and the touch detection ends. On the other hand, if the maximum value Cp is equal to or greater than the detection threshold T as a result of the determination at S503 (case of S503N), the push determination described at S505 is performed.

At S505, a region R (tracking region R) as a target of the same tracking process as a tracking process of the position where the maximum value Cp is output is specified. The tracking process is, for example, a process of specifying whether there is the same one finger or there are two different fingers in multi-touch detection using a plurality of fingers. For example, the level values at positions in eight directions around a target position, such as the position where the maximum value Cp is output, are acquired. When the level values are greater than a predetermined value, the positions are handled as the same region as the target position, and the same level value is provided. In this way, individual tracking regions R are specified in the process.

Next, area data S of the tracking region R and sum total data Σ of the level values C at the positions included in the tracking region R are output S507.

The area data S is data corresponding to the size of the two-dimensional area of the tracking region R. For example, the area data S may be the number of intersection points. According to the example, the value of the area data S1 is 2 in the case of FIG. 4B. The area data S may be data for deriving the area, such as a length and a width, instead of the data indicating the area itself. For example, the area data S may include a length SL or a width SW of the tracking region R. Since the tracking region R is 1 row ×2 columns in the example of FIG. 4B, a value "2" of the length SL may replace the area data S, and the value "2" may be set as area data. The area data S may be data corresponding to one of a long side of rectangle or a major axis of ellipse regarding the tracking region, a maximum distance from the center of gravity of the region, and a maximum length between two positions in the region.

Next, the sum total dataΣ is data corresponding to a sum total value of the level values C at the positions included in the tracking region R. In the case of FIG. 4B, the value of the sum total dataΣ is 21. Note that the value of the sum total data Σ may be a value obtained by applying predetermined calculation or modification to the level values, instead of the sum of the level values C. The sum total dataΣ indicates a volume V when the level value at each position on the two-dimensional map is regarded as the height, and in that respect, the sum total data Σ can also be referred to as volume data.

Figure 6B:
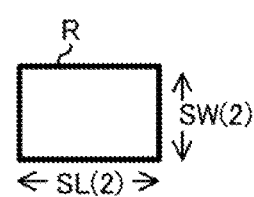
FIG. 6B is a two-dimensional distribution map of signal levels of the state (a)
Figures 7A, 7B:
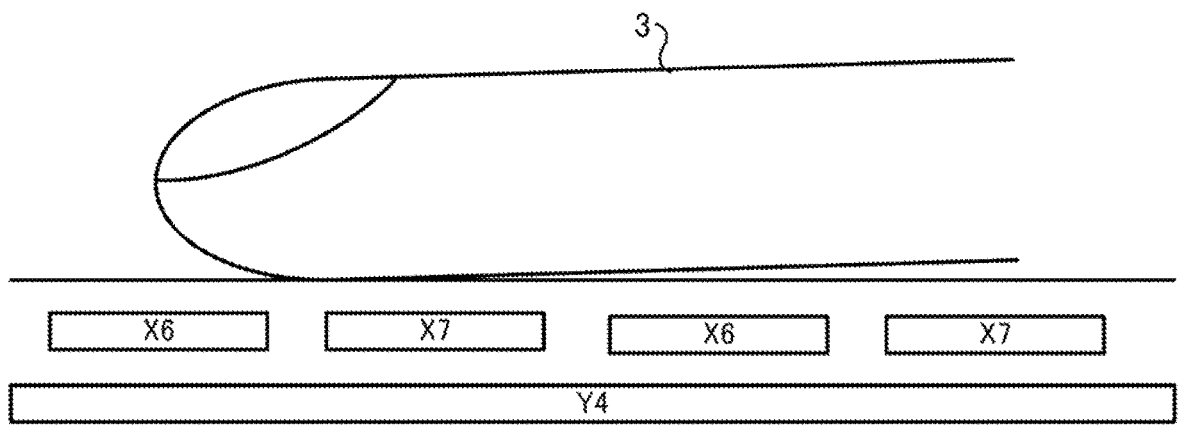
FIG. 7A depicts a state (b) in which capacitance changes in a wide range.
FIG. 7B is a two-dimensional distribution map of the signal levels of the state (b)

In the first embodiment, both of these two types of data are necessary for distinction between (a) outputting data corresponding to the push operation in the case of a strong push with a fingertip (second state, FIG. 1C, FIG. 6B described later) and (b) outputting data corresponding to the touch operation when there is equal to or greater than a predetermined amount of change in the capacitance in a wide range such as when a finger is attached to the touchpad (first state, FIG. 1B, FIG. 7B).

Figure 6A:
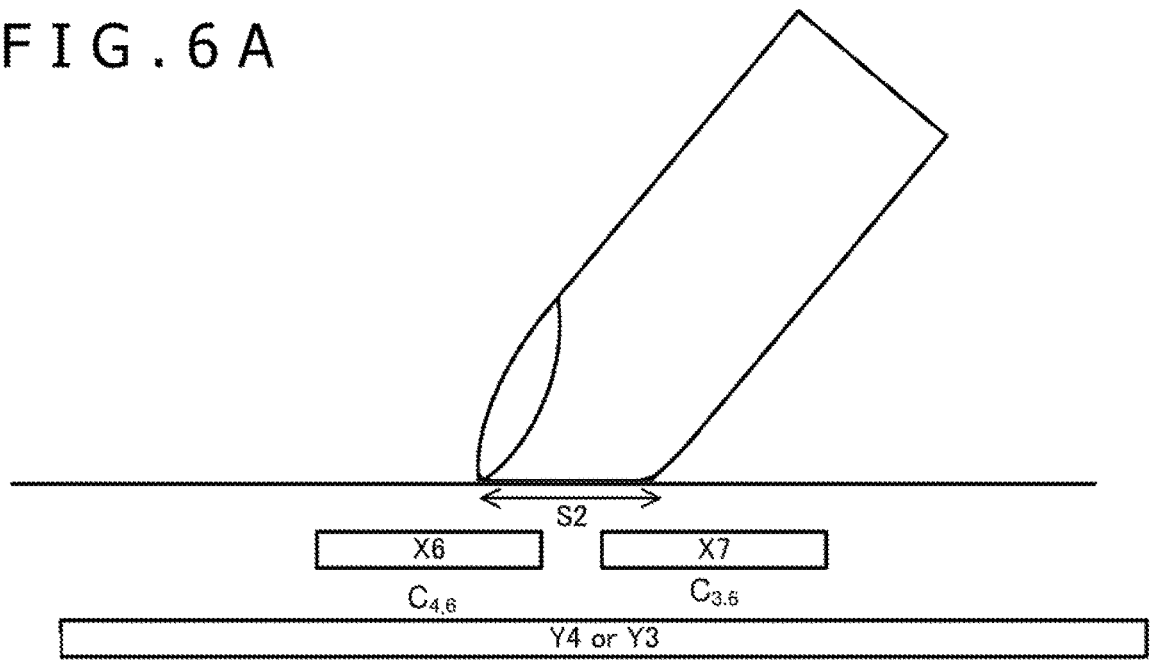
FIG. 6A depicts a state (a) of a strong push with a fingertip (push operation)

First, FIG. 6A is a cross-sectional view illustrating the state (a) of the case of a strong push with a fingertip (push operation) in the second state described in FIG. 1C. In the case of a strong push with a fingertip as in FIG. 6A, the capacitance formed between the indicator 3 and neighboring electrodes (row electrode Y4 and column electrode X6) leads to an increase in the values of the detected level values C compared to the state of FIG. 4A due to various factors, such as a decrease in a distance d caused by local deflection, an increase in the area S functioning as an electrode due to deformation of the fingertip, and insertion of a finger with a high dielectric constant ε. FIG. 6B depicts an example of a two-dimensional distribution of the signal level in the push operation. In the example of FIG. 6B, the value of the area data S is 4 (value of length data SL is 2, value of width data SW is 2), and the value of the sum total dataΣ is 81. Each value is locally larger than the value in the example of FIG. 4B.

FIG. 7A corresponds to the first state described in FIG. 1B and is a cross-sectional view illustrating the second state (b) generated when there is equal to or greater than a predetermined amount of change in the capacitance in a wide range such as when a finger is attached to the touchpad. FIG. 7B illustrates an example of a two-dimensional map of the level values C detected in the state. In the example of FIG. 7B, the area data S with a value of 8 (value of length data SL is 4, and value of width data SW is 2) is large, and the sum total dataΣ with a value of 81 that is the sum total of the level values C is large.

The values of the sum total data Σ are the same in the examples of FIGS. 6B and 7B. Therefore, if only the sum total data Σ is used to detect the push operation, the state of FIG. 7A cannot be excluded, and there is a problem that the state is falsely determined.

On the other hand, both of the sum total data Σ of the signal level and the area data S are used in the disclosure according to the present embodiment, and the area data S and the sum total data Σ are used to perform the push determination (S520) to thereby distinguish the two states.

First, whether the value of the sum total data Σ of the level values C of the region is greater than a predetermined value (volume value) TV is determined (S521). As a result of the determination at S521, if the value of the sum total data Σ is smaller than the value TV, it is determined that the normal touch operation is performed instead of the push operation, and the touch event Etd is output as a value of the event E.

On the other hand, if the value of the sum total data Σ is greater than the value TV as a result of the determination at S521, the value of the area data S is further compared with a predetermined value (area value) TS (S522). As a result of the comparison at S522, if the value of the area data S is smaller than the value TS (S522N), that is, if the level values C are increasing only locally, it is estimated that the push operation is performed, and the push event Epd is output as a value of the event E.

On the other hand, if the value of the area data S is larger than the value TS as a result of the comparison at S521, it is determined that this is the case (b) in which there is equal to or greater than a predetermined amount of change in the capacitance in a wide range such as when a finger is attached to the touchpad, and the normal touch event Etd is output as the event Σ instead of the push event Epd.

In this way, according to the disclosure of the present embodiment, the push operation is extracted based on the sum total data Σ of the signal level, and whether the value of the sum total data is in a local range or a wide range is determined based on the area data S. This enables the distinction according to the signal level value per unit area. As a result, even for the same value of the sum total data Σ as in FIG. 6B and FIG. 7B, the push determination function can be realized, in which the data corresponding to the push operation is output when the change level of the capacitance is locally increased due to a strong push with a fingertip, and the operation is not mistaken for the push operation when the capacitance is changed in a wide range such as when a finger is attached to the touchpad.

Note that in the present embodiment, the push operation determination is not limited to the determination directly using the sum total data Σ and the area data S. For example, a power density derivation of acquiring the level value per unit area based on the sum total data Σ and the area data S may be included, and whether to output the event corresponding to the touch operation or to output the event corresponding to the push operation may be determined based on the level value per unit area.

Second Embodiment

Figure 8:
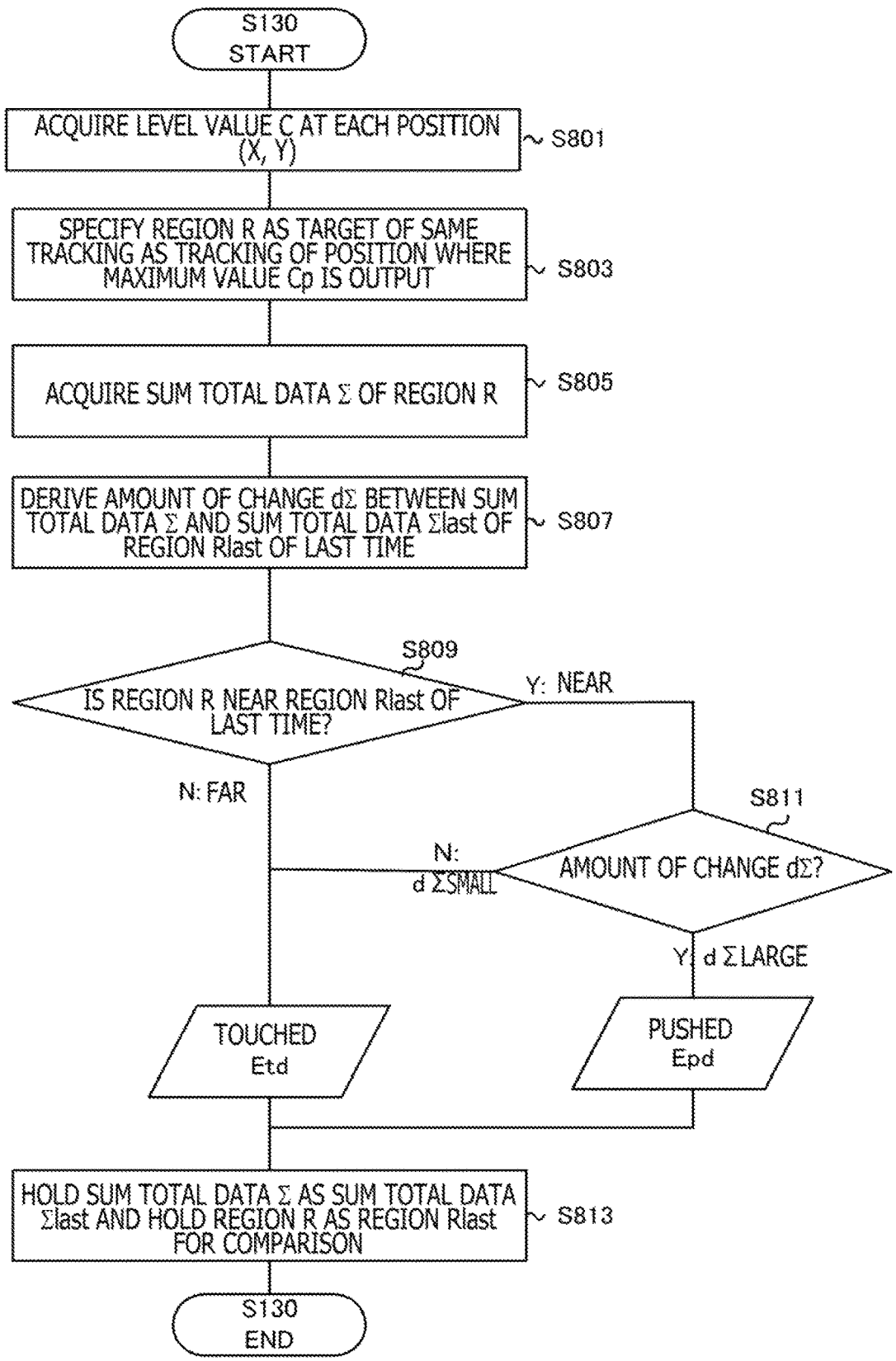
FIG. 8 is a flowchart of touch detection involving push determination according to a second embodiment of the present disclosure.

FIG. 8 is an operation flowchart of the touch detection with push determination (S130) according to a second embodiment.

Acquiring an amount of time change dΣ of the sum total data Σ is included in the present embodiment. In the push operation determination, whether to output the touch event Etd corresponding to the touch operation or to output the push event Epd corresponding to the push operation is determined based on the sum total data Σ, the area data S, and the amount of time change dΣ of the sum total data.

First, as in the first embodiment, the level value C at each position is acquired (S801), and the tracking region R as a target of the same tracking as tracking of the position where the maximum value Cp is output is specified (S803). Next, the sum total data Σ of the tracking region R is acquired (S805).

Next, at S807, the amount of change dΣ between the sum total data Σ and sum total data Σlast of the last time is derived (S807).

During the push operation, the value of the amount of time change dΣ around the same tracking region R of the sum total data Σ tends to be larger than during the touch operation. According to the operation flow of the modification, the accuracy of distinction between the push operation and the touch operation can be increased. Therefore, the amount of time change dΣ is added as a criterion for determination.

First, whether the tracking region R is positioned near a tracking region Rlast of the last time is determined (S809). If the tracking region R is not positioned near the tracking region Rlast of the last time (S809N: far), the touch event Etd is output as the event E.

On the other hand, if the tracking region R is positioned near the tracking region Rlast of the last time (S809Y), whether the amount of time change dΣ is greater or smaller than a predetermined value is determined. If the amount of time change dΣ is greater than the predetermined value (Y in S811), data corresponding to the push event Epd is output as the event E.

On the other hand, if the amount of time change dΣ is smaller than the predetermined value (S811N), data corresponding to the touch event Etd is output as the event E. Lastly, the tracking region R and the sum total data Σ in the detection of this time are held as the tracking region Rlast and the sum total data Σlast of the last time for the next detection (S813).

According to the disclosure of the present present embodiment, the position of the tracking region R and the amount of time change Σ of the level value C of the sum total data Σ are used to determine whether the amount of time change dΣ at a predetermined position is increased. This can improve the determination accuracy of the push determination for determining whether the push operation is performed or the touch operation is performed.

Although the preferred embodiments of the present disclosure have been described, the present disclosure is not limited to the embodiments in any sense, and it is obvious that the present disclosure can be carried out in various modes without departing from the scope of the present disclosure.

For example, the disclosures of the embodiments may be combined. The first embodiment may further include acquiring the amount of time change of the sum total data, and in the push operation determination, whether to output the event corresponding to the touch operation or to output the event corresponding to the push operation may be changed based on the sum total data, the area data, and the amount of time change of the sum total data.

In the embodiments, the operation flows of FIGS. 5 and 8 may be divided into acts performed by the integrated circuit 10 and acts performed by the host controller 20. For example, in the first embodiment, the integrated circuit 10 may output the sum total data E and the area S to the host controller 20, and the host controller 20 may perform the push determination at S520 of FIG. 5 based on the data.

What is claimed is:

1. A method performed by an integrated circuit connected to a touch panel used with a display apparatus that displays a graphical user interface, the method comprising:

acquiring level values indicating changes in capacitance at positions in a two-dimensional region of the touch panel;

detecting a touch to the touch panel by an indicator based on a maximum value of the level values at the positions in the two-dimensional region;

specifying a tracking region of a position where the maximum value is output;

outputting area data corresponding to a size of the tracking region and sum total data corresponding to a sum total value of the level values at the positions included in the tracking region; and in a case where the sum total data indicates the sum total value is greater than a predetermined sum total value, (a) determining an event corresponding to a push operation is to be output when the area data indicates a second area value smaller than a first area value, or (b) determining an event corresponding to a touch operation is to be output when the area data indicates the first area value.

2. The method according to claim 1, wherein
the area data includes length data of the tracking region, and
the method further comprises:
in a case where the sum total data indicates the predetermined sum total value,
(a) outputting the event corresponding to the touch operation when the length data of the tracking region indicates a first length value, and
(b) outputting the event corresponding to the push operation when the length data of the tracking region indicates a second length value shorter than the first length value.

3. The method according to claim 2, wherein
the length data of the tracking region corresponds to one of: a long side of rectangle or a major axis of an ellipse regarding the tracking region, a maximum distance from a center of gravity of the tracking region, or a maximum length between two positions in the tracking region.

4. The method according to claim 1, further comprising:
acquiring a level value per unit area based on the sum total data and the area data, wherein the determining the event corresponding to the touch operation is to be output or the determining the event corresponding to the push operation is to be output is based on the level value per unit area.

5. The method according to claim 1, further comprising:
acquiring an amount of time change of the sum total data; and
changing a determination whether to output the event corresponding to the touch operation or to output the event corresponding to the push operation based on the sum total data, the area data, and the amount of time change of the sum total data.

6. A method performed by an integrated circuit connected to a touch panel, the method comprising:
acquiring level values indicating changes in capacitance at positions in a two-dimensional region of the touch panel;
detecting a touch to the touch panel by an indicator based on a maximum value of the level values at the positions;
outputting sum total data of the level values of a tracking region that is positioned around a position where the maximum value is output;

acquiring an amount of time change of the sum total data; and determining whether an event corresponding to a touch operation is to be output or an event corresponding to a push operation is to be output based on the amount of time change of the sum total data.

7. The method according to claim 6, wherein the determining whether the event corresponding to the touch operation is to be output or the event corresponding to the push operation is to be output includes:

determining the event corresponding to the touch operation is to be output when the amount of time change of the sum total data is smaller than a predetermined change value, and determining the event corresponding to the push operation is to be output when the amount of time change of the sum total data is greater than the predetermined change value.

8. The method according to claim 7, wherein the determining whether the event corresponding to the touch operation is to be output or the event corresponding to the push operation is to be output includes:

when the sum total data indicates a value greater than a predetermined sum total value, (a) determining the event corresponding to the touch operation is to be output when an area of the region indicates a first area value, and (b) determining the event corresponding to the push operation is to be output when the area of the region indicates a second area value smaller than the first area value.

* * * * *